United States Patent [19]
Kichury

[11] Patent Number: 6,057,850
[45] Date of Patent: May 2, 2000

[54] BLENDED TEXTURE ILLUMINATION MAPPING

[75] Inventor: John J. Kichury, Morris Plains, N.J.

[73] Assignee: Silicon Graphics, Inc., Mountain View, Calif.

[21] Appl. No.: 08/895,258

[22] Filed: Jul. 15, 1997

[51] Int. Cl.⁷ .................................................. G06T 11/40
[52] U.S. Cl. ............................................................ 345/430
[58] Field of Search .................................... 345/419, 425, 345/426, 429, 430

[56] References Cited

U.S. PATENT DOCUMENTS 5,867,166   2/1999   Myhrvold et al. ..................... 345/419

*Primary Examiner*—Mark R. Powell
*Assistant Examiner*—Chante' E. Harrison
*Attorney, Agent, or Firm*—Wagner, Murabito & Hao LLP

[57] ABSTRACT

A method and apparatus for expeditiously rendering realistic bumpy self-shadowed textured computer graphics is provide. Illuminated texture images of an object are obtained and stored in a data base as texture maps. These illuminated texture images are superimposed on top of each other and blended according to their weighted illumination contributions from the light sources to create a blended texture map. This blended texture map is then mapped to the desired surface of the geometric object.

17 Claims, 4 Drawing Sheets

BLENDED TEXTURE ILLUMINATION MAPPING

BACKGROUND OF THE INVENTION

1. Field of the Invention

The invention generally relates to computer graphics, and more particularly relates to computer graphics illumination modeling.

2. Background of the Invention

In recent years, advances in computer technology have fueled an explosive growth in the field of computer graphics. The rendering of two dimensional (2D) and three dimensional (3D) objects have become dramatically more realistic as demonstrated by computer-generated commercials and movie special effects. As such, the task of generating computer graphics, which may include complex three-dimensional objects with full color, shading, texture mapping, and transparency blending, is a complex one that involves processing huge amounts of graphical data. Demands for even more sophisticated graphics capabilities with more realism to be delivered at a faster rate result in a need for continuous improvements in software and hardware implementations.

In generating a computer geometric model of an object, parametric surface patches are connected together to form the desired graphics object. Each parametric surface patches are further subdivided into smaller and plainer elements. These smaller and plainer elements are called primitives. A primitive can be any solid or patterned shape such as polygons, spheres, cylinders, free-form surfaces, etc. Most commonly, primitives are triangles. Since each graphics primitive in the geometrical model is represented by a data structure, the geometrical model is a linked data structure stored in computer memory. Each graphics primitive in the geometrical model is, in turn, associated with the proper attributes to give it the desired color, shade, texture, and transparency. For this reason, attributes are necessary to make computer graphics more realistic, Texture mapping is a well-known technique used to apply these attributes to the geometric model to make the computer graphics generated more realistic. Texture mapping is particularly useful and efficient when the detail is fine and intricate. In texture mapping, a digitized image (a.k.a. texture map) having individual elements, which are often called texels, depicting the detail is mapped onto a surface. Generally, texture mapping can be accomplished in two steps. First, the four corners of the pixel on the monitor screen is mapped onto the surface's coordinate space (u,v). Next, the pixel's corner points in the surface's coordinate space (u,v) are mapped into the texture's coordinate space (s,t). A value for the pixel is computed by summing all texels within the quadrilateral defined by the four (s,t) points in the texture map.

However, texture mapping is not effective in depicting a rough and/or uneven surface (e.g., a stone, a brick, etc.). If the texture map is a photograph of a rough and/or uneven surface, the surface that is texture mapped will continue to appear geometrically smooth. Due to the unevenness of the rough surface, the direction to the light source used to create the texture map is typically different from the direction to the light source illuminating the surface that is texture mapped. Accordingly, unless such directional differences are minimized or compensated, the shadows that are necessary in depicting changing depths associated the peaks and valleys in a bumpy surface are not produced. Hence, the surface that is texture mapped continues to appear smooth.

One way to depict a rough and/or uneven surface is to geometrically model every surface bump and defect. To do so may, however, takes hours in time. To provide the appearance of a bumpy surface without requiring geometric modeling, bump mapping was developed. Bump mapping involves adjusting the surface normal vector to reflect the unevenness in a surface, before it is used in the illumination model. Accordingly, a bump map is an array of displacements, each of which can be used to stimulate displacing a point on a surface a little above or below that point's actual position. A good approximation to the new (unnormalized) normal $\tilde{N}'$ that is then substituted for the surface normal in the illumination equation is:

$$\tilde{N}' = \tilde{N} + \frac{B_u(\tilde{N} \times \tilde{A}_t) - B_v(\tilde{N} \times \tilde{A}_s)}{|\tilde{N}|} \quad (1)$$

where $\tilde{N}$ is the old normal, $|\tilde{N}|$ is the magnitude of vector $\tilde{N}$, $\tilde{A}_s$ and $\tilde{A}_t$ are partial derivatives of a point on the surface represented by vector $\tilde{A}=[x(s,t), y(s,t), z(s,t)]$, and $B_u$ and $B_v$ are the partial derivatives of the selected bump map entry B with respect to the bump-map parameterization axes, u and v. For a discussion of texture mapping, bump mapping, and illumination equations, refer to James D. Foley et al., "Computer Graphics" (2d ed. 1996) which is herein incorporated by reference.

Although, bump mapping is capable of creating realistic bumpy textured computer graphics, it is also undesirable for a number of reasons. Due to the number of calculations required for each point on the surface, bump mapping is also a rather slow process. Given the current technology, the texture of one image may take many seconds or even minutes to process under bump mapping. Furthermore, bump mapping may not exhibit areas of the surface shadowed by the bumps which tend to decrease the realism of the computer-generated graphics.

Thus, a need exists for a more expeditious technique to create realistic bumpy self-shadowed textured computer graphics.

SUMMARY OF THE INVENTION

Accordingly, the present invention provides an expeditious technique to create realistic bumpy self-shadowed textured computer graphics.

The present invention meets the above need with a method to render realistic bumpy self-shadowed textured computer graphics. Under the present invention, after the series of illuminated texture images are created either through physical sampling or computational derivation, the illuminated texture images created are blended together according to the illumination contribution of the light sources associated with the illuminated texture images. The blended image is mapped to the object's arbitrary surfaces. Hence the invention is named blended texture illumination mapping. In blending the illuminated texture images together, realistic bumpy self-shadowed textured computer graphics can be created. Such blending is accomplished by superimposing the illuminated texture images on top of each other thereby allowing bump shadows produced as a result of the different lighting angles to be presented in the blended image.

More specifically, the method comprises the following steps. First a geometric model of an object is created. Next, N illuminated texture images of a bumpy surface are created wherein each of the N illuminated texture images is created by positioning a light source at a predetermined position. The N illuminated texture images are then mapped to a selected surface of the geometric model of the object.

In mapping the N illuminated texture images to the selected surface, first, the function settings are set as follows: the blending function is disabled, the depth function is set to allow coplanar rendering, the depth buffer is enabled, the shading function is enabled, and the graphics substantive lighting function is disabled. Next, the object is drawn in ambient lighting. Following the enabling of the blending function, an illuminated texture image is selected. A vertex of the selected surface is selected subsequently. Red, Green, Blue (RGB) and transparency (alpha) values related to the vertex selected are computed based on illumination contribution from the light source. Using the RGB and alpha values computed, the selected vertex of the selected surface is drawn. The RGB and alpha values computing step and the vertex drawing step are carried out for the other vertices of the selected surface. All the steps following the enabling of the blending functions are repeated for the other illuminated texture images.

All the features and advantages of the present invention will become apparent from the following detailed description of its preferred embodiment whose description should be taken in conjunction with the accompanying drawings.

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

Figure 1:
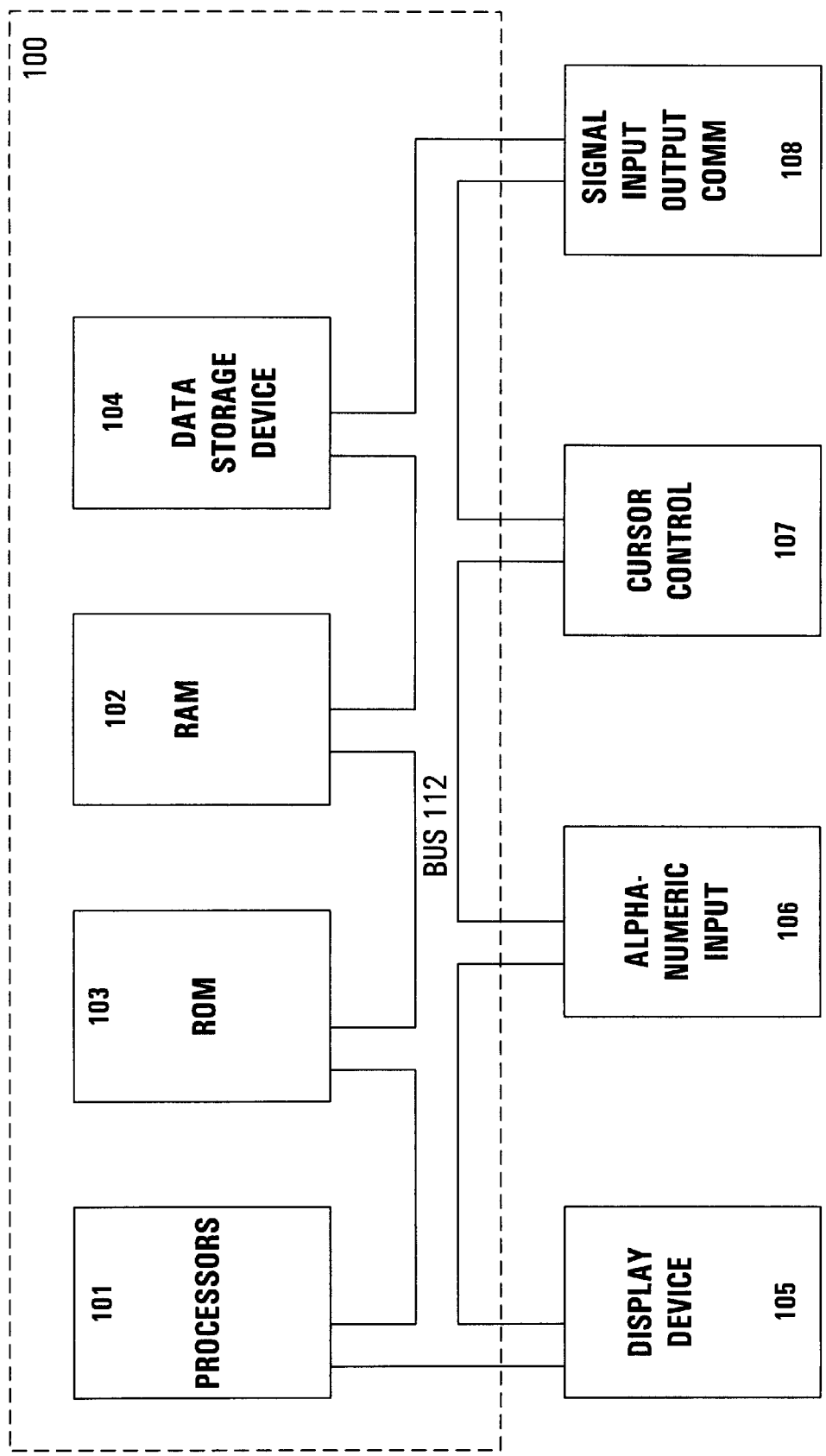
FIG. 1 is a system level block diagram illustrating a computer system that implements the steps in accordance with the present invention.

Reference is made to FIG. 1 illustrating a block diagram of computer system 100 upon which the present invention may be implemented or practiced. It is to be appreciated that computer system 110 is exemplary only and that the present invention can operate within a number of different computer systems including general purpose computers systems, embedded computer systems, and computer systems specially adapted for electronic design automation. In the following discussions of the present invention, certain processes and steps that are realized as a series of instructions (e.g., software program) that reside within computer readable memory units of system 100 and executed by processors of system 100.

In general, computer system 100 used by the present invention comprises address/data bus 112 for conveying information and instructions, one or more processors 101 coupled with bus 112 for processing information and instructions, a random access memory (RAM) 102 for storing digital information and instructions, a read only memory (ROM) 103 for storing information and instructions of a more permanent nature. Because computer system 100 can have more than one processors 101 (e.g., a CPU and a number of task specific processors), computer system 100 can be adapted to process information such as graphics in parallel if it is so desired. In addition, computer system 100 may also include a data storage device 104 (e.g., a magnetic, optical, floppy, or tape drive) for storing vast amounts of data, and an I/O interface 108 for interfacing with peripheral devices (e.g., computer network, modem, etc.). Moreover, computer system 100 may include a display device 105 for displaying information to a computer user, an alphanumeric input device 106 (e.g., keyboard), and a cursor control device 107 (e.g., mouse, trackball, lightpen, etc.) for communicating user input information and command selections.

Figure 2:
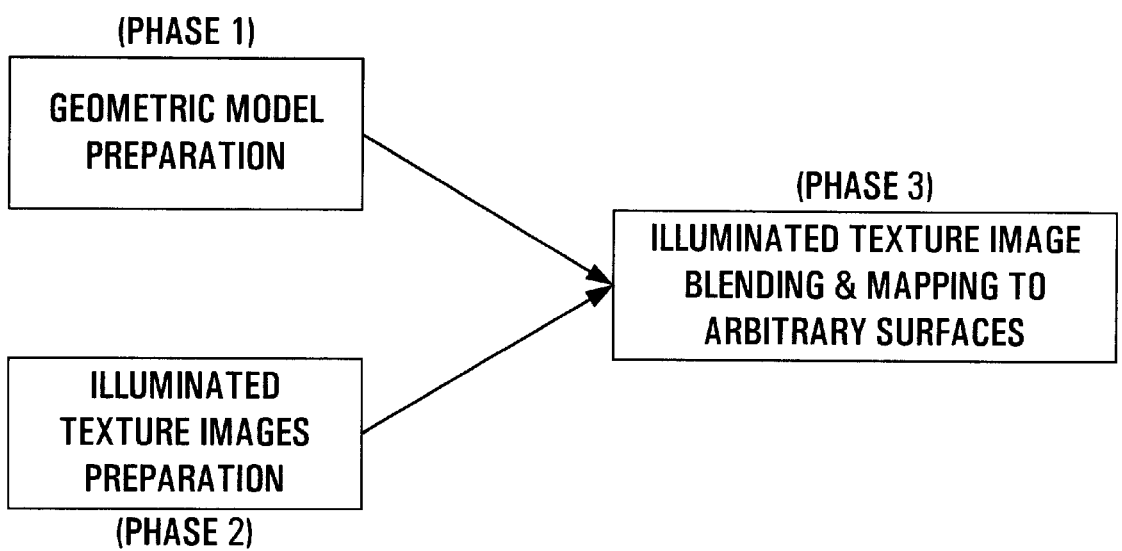
FIG. 2 is a high level block diagram illustrating the three phases involved in the present invention.

In accordance with the present invention, multiple texture images of an object's surface are created and then blended together by computer implemented steps to produce realistic self-shadowed bumpy surfaces. FIG. 2 is a block diagram illustrating the three phases in the present invention. In phase 1, a geometric model of an object is created. Next, illuminated texture images of the object's surface are created in phase 2. Finally, the illuminated texture images of the object's surface are selectively blended together and the resulting blended texture is then mapped to the object's arbitrary surfaces in phase 3.

A geometric model of an object can be created using commercially available graphics application program interface (API) software such as Open Graphics Library (Open GL). Typically, the geomtric model is a mesh of connected polygons. Upon being generated, the geometric model of an object is stored in RAM 102. In general, the geometric model is a linked data structure defining the shape of the object, attributes such as color or surface texture, and connectivity relationships that describe how the components are interconnected. In accordance with the present invention, however, it is important that the geometric model created is set up to contain vertex normals, vertex texture coordinates (s,t), and surface direction coordinates (u,v). In short, vertex normals refer to normal vectors located at the vertices of the polygon, vertex texture coordinates refer to the relative local coordinates that are used to specify the area of a polygon to be texture mapped, and surface direction coordinates refer to the local surface coordinates of each polygon in the geometric model. Vertex normals, vertex texture coordinates, and surface direction coordinates are well-known to persons of ordinary skill in the art.

A series of illuminated texture images can be obtained either by physically sampling a real object or computationally using a commercial modeling and rendering software package capable of bump mapping such as Alias/Wavefront's Power Animator™. In physically sampling a real object, a digital camera is used to take a series of digitized images of a representative surface of the object. The digitized images are taken with the digital camera aiming normal to the selected surface of the object and a single light source strategically positioned above the camera at different points on an imaginary hemisphere. While more illuminated images allow for more realistic self-shadowed bumpy surfaces to be produced, the minimum number of illuminated images required in the present invention is nine (9).

Figure 3:
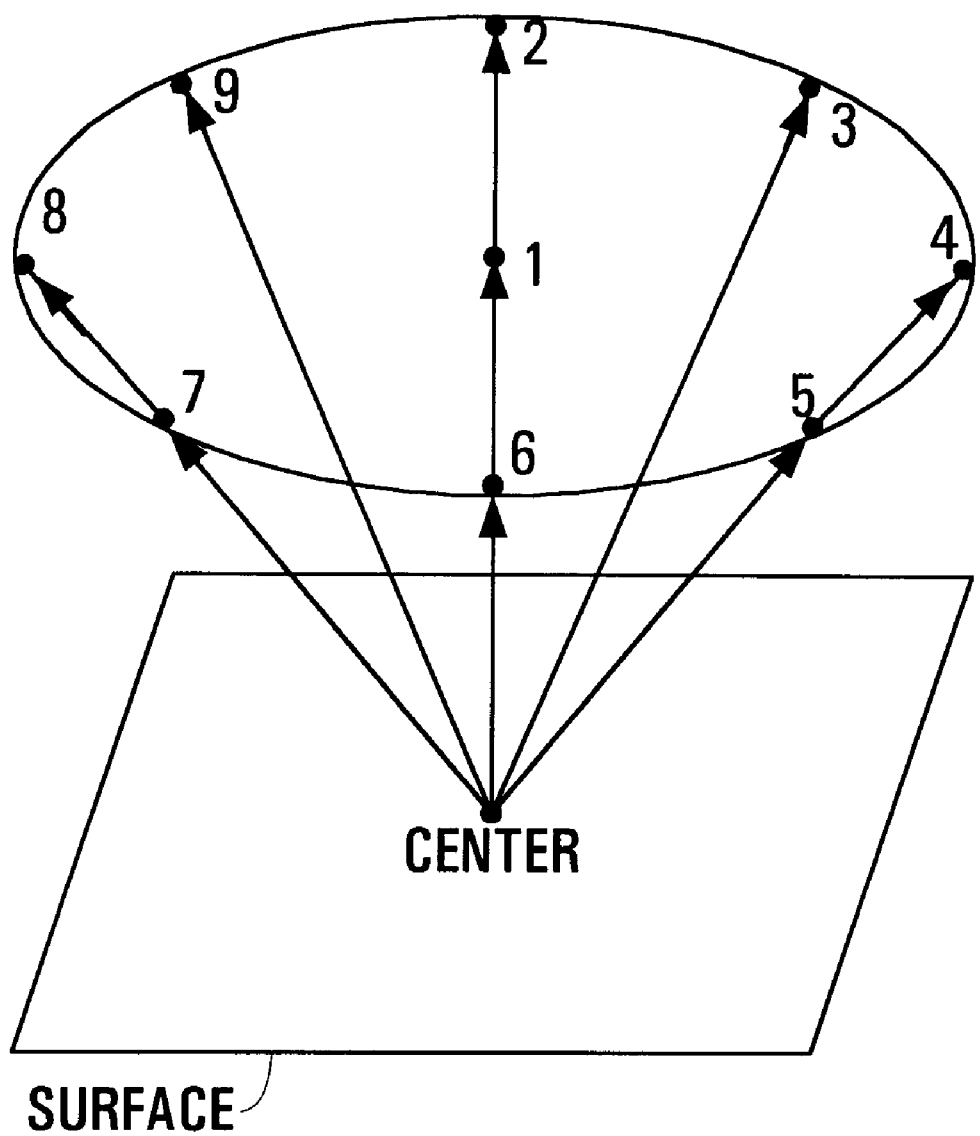
FIG. 3 illustrates the light source positions relative to the object's surface in creating an illuminated texture image in accordance with the present invention.

Refer now to FIG. 3 illustrating the light positions relative to the top view of a surface. As shown in FIG. 3, the light source positions 1–9 are located on an imaginary circular plane that is displaced a predetermined distance from the object's surface. Light source position 1 is at the center of the circular plane, light source position 2 is at the angular position of 0 degree angle on the circle, light source position 3 is at 45 degree angle, light source position 4 is at 90 degree angle, light source position 5 is at 135 degree angle, light source position 6 is at 180 degree angle, light source position 7 is at 225 degree angle, light source position 8 is at 270 degree angle, and light source position 9 is at 315 degree angle.

If the illuminated images are computationally obtained, based on the geometrical model first created, at least 9 different bump-mapped images of a representative surface of the geometrical model are created using the rendering software. Each of the rendered images is created with a single light source positioned at the locations described above. It is to be appreciated that while illuminated texture images created by physically sampling the object with the camera take longer to produce, these illuminated texture images have a higher degree of realism.

After the series of illuminated texture images are created either through physical sampling or computational derivation, they are stored in a data base RAM 102. More particularly, each illuminated texture image is stored together with an associated normalized three dimensional vector from the center of the object's surface to the corresponding light source's position. Next, the illuminated texture images created are blended together according to the illumination contribution from the light sources associated with the illuminated texture images. The blended image is mapped to the object's arbitrary surfaces in accordance with the present invention. Hence the invention is named blended texture illumination mapping.

In blending the illuminated texture images together, realistic bumpy self-shadowed textured computer graphics can be created. Such blending is accomplished by superimposing the illuminated texture images on top of each other thereby allowing bump shadows produced as a result of the different lighting angles to be presented in the blended image. In general, the blended illuminated texture images are expressed according to the following illumination equation:

$$\text{intensity}(x, y) = \sum_{i=0}^{n-1} (image_i(x, y)) * \text{clamp}(\text{Light} \cdot DirVec_i) \quad (2)$$

where intensity is the combined pixel intensity at (x,y) to be computed, $image_i$ is the sampled image pixel, n is the number of texture sample images, Light is the normalized light vector from the center of the sampled images to the light source illuminating the object at render time, and $DirVec_i$ is the normalized direction vector paired with the sampled $image_i$ and specifies the direction of the light when the $image_i$ was obtained.

According to equation (2) above, the intensity contributions from the illuminated texture images at pixel (x,y) are determined from a weighted summation based on the dot product of the light vector and the direction vector clamped in the range of 0–1. In other words, for each pixel (x,y), the intensities from the illuminated texture images are combined together according to their illumination contributions associated with the light sources to determine the composite intensity.

Figure 4:
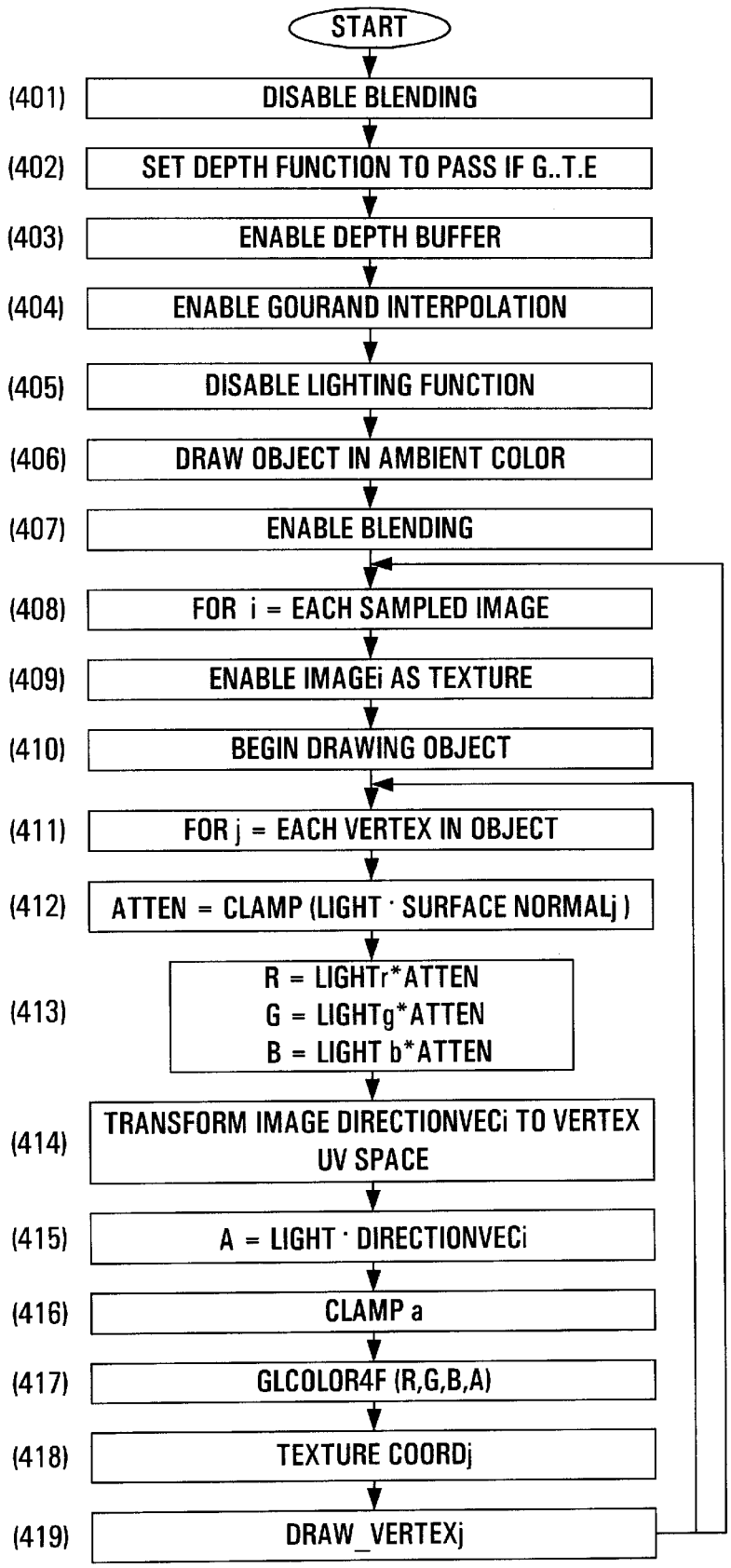
FIG. 4 is a flow chart illustrating the implemented steps of blended texture illumination mapping in accordance with the present invention.

Reference is now made to FIG. 4 illustrating the computer implemented steps to carry out blended texture illumination mapping in accordance with the present invention. In general, the steps in FIG. 4 are designed to implement equation (2) above. The steps in FIG. 4 are carried out when processor 101 executes the instruction codes stored in memory of computer system 100. The cycle begins in step 401 when the computer graphics blending function is disable. Since Open GL is the API software which is used for geometric modeling in the preferred embodiment, such blending function can be easily disabled. In so doing, any image surface that is rendered is presumably done with ambient lighting (i.e., equal lighting on all image surfaces from all directions) and hence no shading.

Next in step 402, the depth function is set so as to allow coplanar rendering. In other words, overlapping drawn objects having the same depth values (e.g., the same distance to the viewer) do not obscure each other. Rather, all the overlapping objects are clearly shown. In general, depth function adjustment can be made by setting the depth value in the z-buffer. For Open GL, the z-buffer's depth values are normally set such that overlapping drawn objects that are closer to the viewer (i.e., having depth values that are less than the depth values for the other overlapping drawn objects) are shown while the overlapping drawn objects that are farther from the viewer are hidden. Thus, to allow for coplanar rendering, the z-buffer's depth values for subsequent rendering passes are set less than or equal to the existing depth.

In step 403, the depth test is enabled. This can be accomplished by enabling the z-buffering. If the z-buffer is not turned on, when overlapping objects are drawn, only the last drawn object is shown because the existing frame buffer's content is replaced by the new values.

The Gouraud interpolation shading (a.k.a., intensity interpolation shading or smooth shading) function is enabled in step 404. The Gouraud shading process involves interpolating polygon vertex illumination values (i.e., lighting intensities). Hence, Gouraud shading requires that the normal be known for each vertex of the polygonal mesh. Lighting calculations to determine the colors at the vertex normals are then performed. These colors are subsequently interpolated to determine the color shades in between the vertices. Accordingly, for example, if a square is drawn with the left vertices in red and the right vertices in orange, under Gouraud shading, a nice gradient change from red to orange is rendered across the square surface. Under the present invention, Gouraud interpolation shading involves at the minimum the interpolation of red, green, blue, and alpha (i.e., transparency) values.

The graphics substantive lighting function is disabled in step 405. In so doing, instead of being generated according to some internal model, the lighting is derived from the normals of the illuminated texture images generated and stored in a data base as discussed earlier. In particular, the lighting is derived from the weighted summation of the dot product of the nine light vectors and the image normals.

Having made the above settings in steps 401–405, the first pass at rendering the object based on data from the geometric model created earlier is carried out next in step 406. According to the settings above, at this first pass, the object is rendered under ambient lighting. Preferably, the ambient color for this first pass is black because it provides the most contrast for subsequent renderings. Moreover, because of the settings above, the first rendering pass also allows the z-buffer depth values for all the pixels of the object to be set. If the geometric model is 3D, the depth values for the pixels will vary according to their locations relative to the viewer.

Upon making the first rendering pass in step 406, the graphics substantive blending function is enabled in step 407. In so doing, the red, green, blue, and alpha color values (hereinafter RGBA) at each object vertex in the present rendering pass are blended with the corresponding RGBA values that are specified in the frame buffer from the previous pass. For example, if the existing color for the object is green and the object's color in the present rendering pass is red with a 50% transparency, the color red will be blended with what is previous there (green) to create a yellow object.

Step 408 is the beginning of a loop wherein the weighted illumination intensity contributed by each illuminated texture image is computed and subsequently added together. The loop results in the object being drawn n times, where n is the number of sampled images. Each time the object is drawn, it is blended with the contents of the frame buffer based on the vertex illumination contribution. In short, the loop implements illumination equation (2) above.

Step 409 is the first step in the loop wherein an illuminated texture image is selected as the current active texture to be mapped to the object's surface. Step 410 begins the drawing of the object. Step 411 is the beginning of a nested loop. For each vertex j of the object, steps 412–418 are performed. In step 412, the attenuation factor is calculated according to the following equation:

$$\text{Atten} = \text{Clamp}(\text{Light} \cdot \text{SurfaceNormal}_j) \qquad (3)$$

where Light is the light vector illuminating the object at render time and $\text{SurfaceNormal}_j$ is the normal vector at the vertex j of the object.

According to the attenuation factor equation (3) above, the attenuation factor is the dot product of the Light vector and the $\text{SurfaceNormal}_j$ vector. As such, the attenuation factor is a function of the cosine of the angle between the Light vector and the $\text{SurfaceNormal}_j$ vector. The illumination intensity is highest if the Light vector is coincident with the $\text{Surfacenormal}_j$. Conversely, the illumination intensity is lowest if the Light vector is perpendicular with the $\text{SurfaceNormal}_j$. Accordingly, as discussed earlier, the clamp function is used to maintain the attenuation factor in the range 0–1 and any negative values (from the cosine of the angle) are discarded.

It is to be appreciated that other more elaborate attenuation equations such as those used in diffuse lighting modeling can be used in place of equation (3) above. More elaborate attenuation equations are discussed, for example, in books on computer graphics such as James D. Foley et al., "Computer Graphics" (2d ed. 1996), which is herein incorporated by reference. Prior to performing the attenuation calculation, however, the $\text{SurfaceNormal}_j$ vector needs to be transformed into the same coordinate system that the Light vector is in. The transformation matrices involved are well-known and should be obvious to a person of ordinary skill in the art. Accordingly, such transformations are not further discussed.

In step 413, the component values of the virtual light that the scene is illuminated with is multiplied with the attenuation value calculated in step 412. In so doing, the intensity of the color is adjusted to the correct level as light is attenuated due to a variety of reasons when it reaches the object surface.

Next, the $\text{DirectionVec}_i$ vector (the vector paired with $\text{image}_i$ and specifying the direction of the light at the time when the $\text{image}_i$ was acquired) is transformed into the vertex coordinate space (u,v) in step 414. The transformation matrices involved are well-known and should be obvious to a person of ordinary skill in the art. Given that there are 9 illuminated texture images in the current example, a total of 9 transformations are required for the nine images. It would be more if there are more illuminated texture images. It is more efficient to transform the vertex coordinate space (u,v), including the normal vector, to the sampled image coordinate space. Also, the light vector is then transformed into the sampled image coordinate space. In so doing, only four transformations are required. As such, depending on how the computer steps are implemented in carrying out the present invention, transforming the vertex coordinate space (u,v) to the sampled image coordinate space may be more efficient. Such transformations should be clear to a person of ordinary skill in the art. Hence, for the sake of brevity and clarity, such coordinate transformations are not discussed any further.

The transformed $\text{DirectionVec}_i$ vector is used to compute an alpha transparency value (a.k.a. A value) for the current illuminated texture image in step 415. The alpha transparency value is computed by taking the dot product between the light vector and the transformed $\text{DirectionVec}_i$ vector. The alpha transparency value is used to determine the color weighted contribution of the current illuminated texture image when it is blended with the other illuminated texture images. The computed alpha transparency value is clamped in the range 0–1 by eliminating negative values in step 416.

The computed RGBA values are provided to Open GL so that the lighting model can be computed in step 417. Normally, the API software, such as Open GL, automatically computes the lighting model (by calculating the RGBA values) based on conditions input by user. However, since the lighting function has been disabled in step 405, computed RGBA values must be specified to Open GL. Next, the current vertex coordinates in geometric model space (x,y,z) are specified to Open GL in computing the lighting model in step 418. Using the RGBA values and the coordinates specified, the vertex is draw in Open GL. Steps 411–419 are repeated for the rest of the vertices of the object. Steps 408–419 are repeated for the rest of the illuminated texture images.

The preferred embodiment of the present invention, an expeditious method to create realistic bumpy self-shadowed textured computer graphics, is thus described. While the present invention has been described in particular embodiments, the present invention should not be construed as limited by such embodiments, but rather construed according to the below claims.

What is claimed is:

1. A method to render blended texture illumination computer graphics, the method comprising the steps of:
   generating a plurality of N illuminated texture images of a bumpy surface, wherein the N illuminated texture images depict the bumpy surface with a light source located at different positions,
   blending the N illuminated texture images to produce the blended texture illumination.

2. The method of claim 1, wherein each of the N illuminated texture images is created by physically sampling the surface using a digital camera.

3. The method of claim 1, wherein each of the N illuminated texture images is created using a commercial modeling and rendering software package capable of bump mapping.

4. A method to render bumpy self-shadowed textured computer graphics, the method comprising the steps of:
   creating a plurality of N illuminated texture images of a bumpy surface, wherein the N illuminated texture images are created by positioning a light source at predetermined positions;

mapping the N illuminated texture images to a selected surface of a geometric model of an object based on illumination contribution from a light source;

superimposing the N illuminated texture images on top of each other; and blending the N illuminated texture images according to an illumination equation:

$$\text{intensity}(x, y) = \sum_{i=0}^{N-1} (image_i(x, y)) * \text{clamp}(\text{Light} \cdot DirVec_i)$$

where intensity is a combined pixel intensity at (x,y) to be computed, image i is an illuminated texture image pixel normalized intensity, N is the number of illuminated texture images, Light is a normalized light vector from a center of an illuminated texture image to a light source, and $DirVec_i$ is a normalized direction vector paired with the illuminated texture $image_i$; wherein resulting values of (Light·DirecVec$_i$) are clamped between 0–1.

5. A method to render bumpy self-shadowed textured computer graphics, the method comprising the steps of:
   a) creating a geometric model of an object;
   b) creating a plurality of N illuminated texture images of a bumpy surface having at least two illuminated texture images, wherein each of the N illuminated texture images is created by positioning a light source at a predetermined position; and
   c) mapping the N illuminated texture images to a selected surface of the geometric model of the object by performing the following steps:
   d) disabling blending function;
   e) setting depth function to allow coplanar rendering;
   f) enabling depth buffer;
   g) enabling shading function;
   h) disabling graphics substantive lighting function;
   i) drawing the object in ambient lighting;
   j) enabling blending function;
   k) selecting an illuminated texture image;
   l) selecting a vertex of the selected surface;
   m) computing red, green, blue (RGB) and transparency (Alpha) values based on illumination contribution from the light source;
   n) drawing the selected vertex of the selected surface using the RGB and Alpha values computed;
   o) repeating steps (l)–(n) for all vertices of the selected surface; and
   p) repeating steps (k)–(o) for all illuminated texture images.

6. The method of claim 5, wherein the N illuminated texture images include at least nine illuminated texture images.

7. The method of claim 6, wherein each of the N illuminated texture images is created by physically sampling the surface using a digital camera.

8. The method of claim 6, wherein each of the N illuminated texture images is created using a commercial modeling and rendering software package capable of bump mapping.

9. The method of claim 5, wherein the shading function is Gouraud Interpolation.

10. The method of claim 6, wherein illumination contribution from the light source is calculated according to:

$$\text{intensity}(x,y) = \text{clamp}(\text{Light} \cdot DirVec_i)$$

where intensity is a pixel intensity at (x,y) to be computed, Light is a normalized light vector from a center of the illuminated texture image to the light source, and $DirVec_i$ is a normalized direction vector paired with the illuminated texture image; wherein resulting value of (Light·DirVec$_i$) is clamped between 0–1.

11. A computer system adapted to render bumpy self-shadowed textured computer graphics, the computer system comprising:
   a bus;
   a processor coupled to the bus;
   memory coupled to the bus, the memory storing a geometric model of an object and a plurality of N illuminated texture images of a bumpy surface, wherein the N illuminated texture images are blended together according to an illumination contribution of a light source.

12. The computer system of claim 11, wherein the N illuminated texture images include at least nine illuminated texture images.

13. The computer system of claim 12, wherein each of the N illuminated texture images is created by physically sampling the surface using a digital camera.

14. The computer system of claim 12, wherein each of the N illuminated texture images is created using a commercial modeling and rendering software package capable of bump mapping.

15. The computer system of claim 11, wherein the shading function is Gouraud Interpolation.

16. A computer system adapted to render bumpy textured computer graphics, the computer system comprising:
   a processor coupled to the bus;
   memory coupled to the bus, the memory storing a geometric model of an object and a plurality of N illuminated texture images of a bumpy surface, the memory further storing instruction codes, the instruction codes, when executed by the processor, maps the N illuminated texture images to a selected surface of the geometric model of the object, the N illuminated texture images including at least two illuminated texture images, wherein illumination contribution from the light source is calculated according to:

$$\text{intensity}(x,y) = \text{clamp}(\text{Light} \cdot DirVec_i)$$

where intensity is a pixel intensity at (x,y) to be computed, Light is a normalized light vector from a center of an illuminated texture image to a light source, and $DirVec_i$ is a normalized direction vector paired with the illuminated texture image; wherein resulting values of (Light·DirecVec$_i$) are clamped between 0–1.

17. The computer system of claim 11, wherein the processor maps the N illuminated texture images to the selected surface of the geometric model of the object according to the steps of:
   a) disabling blending function;
   b) setting depth function to allow coplanar rendering;
   c) enabling depth buffer;
   d) enabling shading function;
   e) disabling graphics substantive lighting function;
   f) drawing the object in ambient lighting;
   g) enabling blending function;
   h) selecting an illuminated texture image;
   i) selecting a vertex of the selected surface;
   j) computing red, green, blue (RGB) and transparency (Alpha) values based on illumination contribution from the light source;

k) drawing the selected vertex of the selected surface using the RGB and Alpha values computed;

l) repeating steps (i)–(k) for all vertices of the selected surface; and m) repeating steps (h)–(l) for all illuminated texture images.

* * * * *